United States Patent Office 2,732,348
Patented Jan. 24, 1956

2,732,348
OIL-IN-WATER METALWORKING LUBRICANT

Willem Frederik Jense, Amsterdam, Netherlands, and Cyril Brynmor Davies, Cheshire, England, assignors to Shell Development Company, Emeryville, Calif., a corporation of Delaware No Drawing. Application January 12, 1953,
Serial No. 330,898

Claims priority, application Netherlands
February 15, 1952

10 Claims. (Cl. 252—33.3)

This invention relates to aqueous emulsions particularly suitable for use in numerous industrial metal-working processes such as metal drawing, rolling, stamping, forging, cutting, and the like. These lubricants are especially valuable for cold drawing of wire, rod, tubing, and shapes.

Problems encountered in lubricating metals under conditions of the uses referred to above, are particularly complex because of the various factors encountered, such as high temperature, high pressure, presence of foreign bodies or contaminants, and the like. To effectively lubricate under these adverse conditions, the lubricant must act both as a lubricant, and in some cases, as a coolant.

In the field of metal drawing and rolling, conventional lubricants, such as palm oil, black oil, or lubricating compositions containing soaps, graphite, lime and the like have serious drawbacks and difficulties are encountered in their use in that these generally available lubricants are incapable of withstanding high pressures and at the same time providing satisfactory lubrication; this results in scoring and wear of the metal being worked. Die wear is also excessive. Additionally, various lubricants, such as oils and greases, have a tendency to stain metals and/or to cause metal pick-up, or are difficult to apply to the metal surface being treated, and even more difficult to remove therefrom after being worked.

To meet the requirements demanded of a good metal-fabricating lubricant of the above class, such lubricant must have as essential properties: high film strength, weld prevention, ability to reduce friction, ability to wet the metal surface being worked and to adhere thereto, ability to produce a good surface finish, property of easy application and removal, and freedom of causing on annealing of staining or discoloration; the lubricant must also have good stability and the property of causing fines, abrasives and the like to settle and separate out of the lubricating system.

It is an object of this invention to provide an improved metal-working lubricant meeting the above requirements. It is another object of this invention to provide a lubricant for metal-working which is stable and non-corrosive. Still another object of this invention is to provide a metal-working lubricant having the property of resisting displacement from metal surfaces. Furthermore, it is an object to provide a metal-working lubricant which is non-staining and which can be easily applied and removed from lubricated surfaces. A more specific object is to provide an improved lubricant for use in the working of carbon steels.

It has now been discovered that an excellent metal-working lubricant can be provided by forming an oil-in-water emulsion containing as an active and essential ingredient polyvinylhalides and polyvinylidene halides. Specifically included are polyvinylchloride, polyvinylfluoride, polyvinylidene chloride, and the like. The molecular weight of the polymeric agents of this invention and mixtures thereof can vary over a wide range, of which polymerics having an average molecular weight of 40,000 to 100,000 are preferred. Specific examples of polymers within the above-mentioned molecular weight range include polyvinylchloride, polymethylvinyl chloride, polyvinylallyl chloride, polyvinylchlorostyrene, etc. The molar proportion of the halo vinyl material is at least 50%.

The polymeric compounds can be modified and improved by subjecting them to halogenation, sulfurization and/or phosphorization. Similarly, sulfurized polyvinylchloride and $P_2S_5$ treated polyvinylchloride are effective in metal working oil-in-water emulsions of this invention.

The polar containing polymeric compounds of this invention can be incorporated in various ways in the oil-in-water emulsion. A suitable method consists in adding the polyvinylhalide in the form of an aqueous suspension to the oil-in-water emulsion and mixing the components by agitating them together into an outwardly homogeneous mass. The aqueous polyvinylhalide suspension may be, for instance, a suspension of 20–40 parts by weight of polyvinylchloride in 60–80 parts by weight of water, which contains an emulsifier for the polyvinylchloride, such as an alkali metal salt of an acid, sulfuric acid ester of an aliphatic alcohol with 10 or more carbon atoms or an alkali metal salt of an alkyl sulfonic acid with at least 10 carbon atoms. An aqueous suspension of polyvinylhalide may also be added to an oil which has not yet been emulsified in water. When this oil contains an emulsifier, it may be dispersed in the suspension of polyvinylchloride by agitation, if desired with the addition of water. If desired, it is also possible to add an oil as such to an aqueous suspension of polyvinylhalide and then, if necessary, disperse the oil by agitating the mixture while adding an emulsifier for the oil and possibly water.

Any oil-in-water emulsion, applicable per se in metal-working operation, is suitable as an oil-in-water emulsion, in which the polyvinylhalide is incorporated.

The oil may be either a mineral oil, or a vegetable or animal oil or fat.

Oils of very divergent viscosities are suitable as mineral oil. The choice of the oil depends on the purpose, for which the emulsion ultimately obtained is to be used. Thus, to prepare so-called cutting oils, an oil with a comparatively low viscosity, for example a spindle oil, will be used, while oils with a higher viscosity will be employed when the emulsion finally obtained is used for drawing aluminum tubes or aluminum wire.

Examples of suitable vegetable or animal oils or fats are wool grease, tallow fat, rapeseed oil, cottonseed oil, castor oil, lard, fish oil, sperm oil, palm oil. Blown oils, such as blown rapeseed oil, may also be used. Partial esters of polyvalent aliphatic alcohols, such as glycerol mono-oleate, as well as fatty acid soaps, which may or may not contain free fatty acids, are also suitable as oil component.

The oil component in the oil-in-water emulsions, in which the polar containing polymeric compound such as polyvinylhalide is incorporated, may also consist partly of a mineral oil and partly of a vegetable or animal oil or fat. If desired, synthetic oils, particularly synthetic lubricating oils, such as di-octyl sebacate, polypropylene glycols and alkylate oils, may also be used in the oil-in-water emulsions.

Emulsifiers suitable for forming stable oil-in-water emulsions include organic sulfo compounds such as metal salts (Na, K, Ca, Ba) of petroleum sulfonic acid, diwax benzene sulfonic acid, alkyl phenol sulfonic acid; salts of sulfonated fatty oils and derivatives thereof, e. g., castor oil, rapeseed oil, lard oil; naphthenic acid soaps; soaps of higher fatty acids, particularly those with 12 or more carbon atoms, tall oil soaps, rosin soaps, salts of alkanol amines with higher fatty acids, for example, tri-ethanol amine-oleate or -linolate, alkali metal soaps of oxidized hydrocarbons, alkali metal salts of acid sulfuric acid esters of aliphatic alcohols with 12 or more carbon atoms, further casein, ethylene oxide condensation products, such as the condensation products of ethylene oxide and oleic acid, or of ethylene oxide and alkylated phenols.

When the oil component is emulsified in water before the addition of the polymer such as a polyvinylhalide, strongly divergent quantities of water may be used in proportion to the oil component. Generally speaking, it may be said that the water content of the oil-in-water emulsion, in which the polyvinylhalide is incorporated, may vary from 30-99% by weight, calculated on the components of the oil-in-water emulsion before the addition of the polyvinylhalide.

The ratio of the quantities in which the oil component and the polymers of this invention are present in the emulsions ultimately obtained, may vary within wide limits. Generally speaking, ratios of 1-100 parts by weight and preferably 20-50 parts by weight of a polymer such as polyvinylhalide or polyvinylidene halide, calculated as dry substance, to 100 parts by weight of the oil component, also calculated on the anhydrous state, come into consideration.

After an oil-in-water emulsion containing a polymer of this invention or mixtures thereof have been obtained, it is still possible to dilute this emulsion in the desired manner with water. The degree of dilution depends on the particular purpose for which the emulsion is employed. Generally about 1 part of the emulsion concentrate can be diluted with from 1-100 and preferably from 10-50 parts of water.

In addition to the above components, other substances, such as stabilizers, extreme pressure agents, anti-oxidants, anti-corrosives, detergents, anti-foaming agents, preservatives, can be incorporated in the emulsions.

Examples of suitable stabilizers are casein, joiner's glue, water glass and bentonite.

To increase the extreme pressure properties of the emulsions, extreme pressure agents suitable for the purpose, particularly compounds which contain sulfur and/or halogen, may be incorporated. To this end, the extreme pressure agent is already incorporated in the oil component before the preparation of the emulsion ultimately desired. Examples of such additions are chlorinated solid paraffin wax with a chlorine content of, for example, 30-40%, sulfurized organic substances, such as sulfurized vegetable and animal oils, sulfurized high fatty acids, for example sulfurized oleic acid, sulfurized terpenes, sulfurized sperm oil, elementary sulfur.

Examples of anti-oxidants, which can be added to the oil-in-water emulsions containing polyvinylhalides, are the anti-oxidants of the phenol or aryl amine type, such as 2,4-dimethyl 6-tertiary butylphenol, 2,6-ditertiary butyl 4-methyl phenol, N,N'-dibutyl-phenylene diamine, phenyl-α- or -β-naphthylamine, furthermore sulfurous anti-oxidants, such as sulfurized alkenes, dialkyl disulfides, dibenzyl disulfide.

Examples of suitable anti-corrosives are higher molecular di-carboxylic acids, for example, alkyl succinic acid with a total of 16 or more carbon atoms; nitrites, e. g., sodium nitrite, dicyclohexyl ammonium nitrite, diisopropylammonium nitrite; chromates, e. g., potassium dichromate; phosphates, e. g., triethanolamine phosphate, potassium hydrogen phosphate, potassium polyphosphate.

Examples of a suitable detergent are the metal salts of acid sulfuric acid esters of higher alcohols, particularly those with 10 or more carbon atoms. Other examples of detergents are the alkali metal soaps of higher fatty acids, the alkali metal salts of alkyl sulfonic acids with 10 or more carbon atoms, and alkali metal alkyl phosphates. In a number of cases the detergents may also act as emulsifier.

To prevent foaming of the oil-in-water emulsions, a small quantity of free acid, particularly a higher fatty acid, for example palmitic acid or oleic acid, or the acids obtained by oxidizing higher paraffin hydrocarbons may be added. Ozocerite, montan wax, polymeric silicones, organic phosphates, e. g., tributyl phosphate, may also be added as anti-foaming agent.

Examples of suitable preservatives, which may be used in the oil-in-wate emulsions to avoid the formation of substances with an unpleasant odor as a result of bactericidal action, are formaldehyde, halogenated phenols, for example, 2,4,5-trichlorophenol, and resin oil.

The emulsions can be adjusted neutrally or made weakly alkaline or weakly acid.

The oil-in-water emulsions which contain a polymer such as polyvinylhalide have better properties in metal-working operations than either the corresponding oil-in-water emulsions, which, however, contain no polyvinylhalide, or suspensions of polyvinyl-halide, which are not mixed with an oil-in-water emulsion.

Suspensions of polyvinylhalide per se are unsuitable for metal-working operations on account of the fact that when such suspensions are used per se rubberlike deposits form both on the tool or instrument used and on the worked metal. Such rubberlike deposits do not occur at all when an oil-in-water emulsion containing for example polyvinylhalide is used.

In general, oil-in-water concentrates of this invention may contain from a fraction of 1% to 20% and higher of the polymer. The concentrate may be further diluted with water so that the final emulsion may contain from as little as a fraction of 1% to as high as 15% and preferably the amount of polymer which can be present in the final metal working emulsion may range from 1 to about 10%.

Compositions of this invention can be prepared in a simple manner requiring no special equipment or technique. The following examples illustrate prepared embodiments of this present invention.

EXAMPLE I

An excellent oil-in-water lubricating emulsion was prepared by forming a concentrate by mixing with about 52% of water, about 40% by weight of wool grease; the free acids which were neutralized with sodium hydroxide; 8% sodium petroleum sulfonate. This mixture was then diluted with a 25% aqueous suspension of polyvinyl chloride having an approximate molecular weight of 65,000 in equal proportions by weight. The final oil-in-water emulsion contained 20% by weight wool grease, 4% by weight of sodium petroleum sulfonate, 12.5% by weight of polyvinylchloride (av. M. W. 65,000) and 63.5% by weight water.

EXAMPLE II

This oil-in-water emulsion was prepared by mixing 3 parts by weight of the concentrate of Example I with 1 part by weight of a 25% aqueous suspension of polyvinylchloride and 1 part by weight of water. The final product contained 24% by weight of wool grease, 4.8% by weight of sodium petroleum sulfonate, 5% by weight of polyvinylchloride (av. M. W. 65,000) and 66.2% by weight of water.

EXAMPLE III

About 1 part by weight of spindle oil containing 20% by weight of sodium petroleum sulfonate and 1% by weight of ethyl alcohol was emulsified with 1 part by weight of a 25% aqueous suspension of polyvinylchloride. The final oil-in-water emulsion contained 40% by weight spindle oil, 10% by weight of sodium petroleum sulfonate, 12.5% by weight of polyvinylchloride (av. M. W. 65,000) and 37.5% by weight of water.

The 25% aqueous suspension of polyvinylchloride used in the preparation of Examples I, II and III had been obtained by emulsion polymerization of an aqueous emulsion of vinylchloride, to which 3% by weight (calculated on the vinylchloride) of an emulsifier obtained by saponifying with caustic soda solution the sulfo-chlorination product of a gas oil fraction, from which the aromatic components had been extracted with a selective solvent.

EXAMPLE IV

A mixture of an oil which contained 75% by weight of spindle oil, 18% by weight of sodium petroleum sulfonate (prepared from oil-soluble petroleum sulfonic acids), 5% by weight of the sodium salt of sulfated fish oil and 2% by weight of ethyl alcohol, was mixed with the same volume of the 5% aqueous dispersion of polyvinylchloride. This mixture was diluted in the ratio of 1 part by weight of the mixture to 20 parts by weight of water.

EXAMPLE V 110 parts by weight of the oil referred to in Example IV (which contains 75% by weight of spindle oil, 18% by weight of sodium petroleum sulfonate, 5% by weight of the sodium salt of sulfated fish oil and 2% by weight of ethyl alcohol) was mixed with 4 parts by weight of a 55% aqueous dispersion of polyvinylchloride. Two diluted emulsions were prepared from this mixture, viz. a diluted emulsion by diluting the mixture with the 10-fold amount of water, and another emulsion by diluting the mixture with the 20-fold amount of water. The first-mentioned diluted emulsion will be referred to below as "emulsion A" and the latter diluted emulsion as "emulsion B."

In addition the efficiency of soluble oil compositions as disclosed in the following patents can be greatly improved from the point of view of increased tool life at increased speeds as well as corrosion inhibiting properties by addition thereto of from a fraction of one per cent to over 20% and preferably from 1 to 5% of a polar-containing polymer of this invention, particularly polyvinylchloride, copolymer of polyvinylchloride-acrylonitrile, copolymer of polyvinylchloride-vinylidene chloride, chlorinated polyvinylchloride, etc.: U. S. Patents 2,578,865, 2,565,938, 2,563,588, 2,524,017, 2,512,435, 2,470,405, 2,466,647, 2,438,461, 2,421,159 and 2,413,855.

In order to illustrate the outstanding properties which compositions of this invention possess, they were subjected to the following tests:

A. In actual plant operation using various lubricants as noted in the table below, copper wire with a diameter of 6.3 mm. was drawn through a die of Widia steel after the copper wire had been pickled with acid and water washed. The wire was subjected to a reduction of about 35% per unit of length. The efficiency of the lubricant was determined from increasing in die life as measured in tens of tons of copper wire drawn and decrease in die wear.

B. In a standard drilling machine, sheets of chrome-nickel steel were drilled and the efficiency of the drilling fluid was determined by the number of holes drilled.

C. In another test wherein steel was drilled by means of a drill of high speed tool steel with a diameter of 0.32 cm. at a speed of 3340 R. P. M. to a depth of 2.1 cm. and drilling time of 3 seconds. The number of drillings determined the efficiency of the lubricant tested.

| Composition [1] | Test | | | |
|---|---|---|---|---|
| | A | | B | C |
| | Life of die, measured in tons of copper wire | Wear of die measured as inc. in mm. of diameter | Number of holes drilled | Average number of drillings |
| Example I | 85 | 0.04 | | |
| Example II | 102 | 0.04 | | |
| Example III | 30 | 0.06 | | |
| Example IV | | | 500 | |
| Example V: | | | | |
|   "Emulsion A" | | | | 393 |
|   "Emulsion B" | | | | 298 |
| Composition R | 32 | 0.04 | | |
| Composition S | 20 | 0.04 | | |
| Composition T | 10 | die fracture | | |
| "Cooledge" (commercial metal working fluid diluted with 20 pts. of water containing no polyvinylchloride). | | | 150 | 173 |

[1] Composition R is the same as Ex. I except that polystyrene has been substituted for the polyvinylchloride.
Composition S is the same as Ex. I except that the polyvinylchloride has been omitted.
Composition T is the same as Ex. III except that the polyvinylchloride has been omitted.

Compositions of this invention can be applied with excellent results to general metal working operating such as cutting, drilling and drawing where lubricating and cooling of tool and work piece under adverse conditions are encountered. Metals machined with the aid of fluids of this invention have good surface finish, are free from rust and stain, and the tool life is excellent.

We claim as our invention:

1. An improved oil-in-water metal working emulsion lubricant concentrate consisting essentially of a major amount of oil-in-water emulsion stabilized by addition thereto of a minor, but stabilizing amount, of an oil-soluble alkali metal petroleum sulfonate, and from a fraction of 1% up to 20% by weight of polyvinyl chloride polymer having an average molecular weight of from 40,000 to 100,000.

2. The composition of claim 1 where one part of the emulsion is diluted with from 1 to 100 parts of water.

3. An improved oil-in-water metal working emulsion lubricant concentrate consisting essentially of a major amount of oil-in-water emulsion stabilized by addition thereto of a minor, but stabilizing amount, of an oil-soluble sodium petroleum sulfonate, and from a fraction of 1% up to 20% by weight of polyvinyl chloride having an average molecular weight of about 65,000.

4. An improved metal working lubricating oil-in-water emulsion comprising about one part by weight of a concentrate consisting of 75% by weight of spindle oil, 18% by weight of sodium petroleum sulfonate, 5% by weight of sodium salt of sulfated fish oil, and 2% by weight of ethyl alcohol, and about one part of a 25% of an aqueous dispersion of polyvinylchloride having an average molecular weight of 65,000, said emulsion being diluted with 20 parts by weight of water.

5. An improved metal working concentrate lubricating emulsion composition containing the following constituents in the following proportions:

| | Percent by weight |
|---|---|
| Wool grease | 20 |
| Sodium petroleum sulfonate | 4 |
| Polyvinylchloride (average molecular weight 65,000) | 12.5 |
| Water | 63.5 |

6. The composition of claim 5 where one part of the emulsion is diluted with about 20 parts by weight of water.

7. An improved metal working concentrate lubricating emulsion composition containing the following constituents in the following proportions:

| | Percent by weight |
|---|---|
| Wool grease | 24 |
| Sodium petroleum sulfonate | 4.8 |
| Polyvinylchloride (average molecular weight 65,000) | 5 |
| Water | 66.2 |

8. The composition of claim 7 where one part of the emulsion is diluted with about 20 parts by weight of water.

9. An improved metal working concentrate lubricating emulsion composition containing the following constituents in the following proportions:

| | Percent by weight |
|---|---|
| Spindle oil | 40 |
| Sodium petroleum sulfonate | 10 |
| Polyvinylchloride (average molecular weight 65,000) | 12.5 |
| Water | 37.5 |

10. The composition of claim 9 where one part of the emulsion is diluted with about 20 parts by weight of water.

References Cited in the file of this patent

UNITED STATES PATENTS

| 2,298,833 | Muessig | Oct. 13, 1942 |
| 2,335,608 | Pings | Nov. 30, 1943 |
| 2,470,913 | Bjorksten | May 24, 1949 |
| 2,511,113 | Piana | June 13, 1950 |
| 2,562,844 | Harman | July 31, 1951 |
| 2,585,820 | Le Grand Morrell | Feb. 12, 1952 |
| 2,610,151 | Putnam | Sept. 9, 1952 |